United States Patent [19]

Dunmire

[11] 3,967,839
[45] July 6, 1976

[54] PIPE SADDLE ASSEMBLY
[75] Inventor: Paul George Dunmire, Sonoma, Calif.
[73] Assignee: Johns-Manville Corporation, Denver, Colo.
[22] Filed: May 28, 1974
[21] Appl. No.: 473,962

[52] U.S. Cl. ................................ 285/199; 285/330
[51] Int. Cl.² .......................................... F16L 41/06
[58] Field of Search ........... 285/197, 198, 199, 330, 285/266, DIG. 19; 138/99; 137/315, 316, 317

[56] References Cited
UNITED STATES PATENTS

| | | | |
|---|---|---|---|
| 1,708,447 | 4/1924 | Maloon | 285/199 X |
| 2,343,235 | 2/1944 | Bashork | 285/DIG. 19 |
| 2,549,027 | 4/1951 | Smulski | 285/266 X |
| 3,009,655 | 11/1961 | Polmer | 285/197 X |
| 3,779,272 | 12/1973 | Dunmire | 285/197 X |

FOREIGN PATENTS OR APPLICATIONS

| | | | |
|---|---|---|---|
| 1,432,635 | 2/1966 | France | 285/197 |
| 727,099 | 3/1932 | France | 285/199 |
| 922,314 | 1/1955 | Germany | 285/Dig. 19 |
| 7,002,538 | 8/1970 | Netherlands | 285/197 |
| 862,796 | 3/1961 | United Kingdom | 137/317 |

Primary Examiner—Dave W. Arola
Attorney, Agent, or Firm—Robert M. Krone; Joseph J. Kelly; Stephen C. Shear

[57] ABSTRACT

A pipe saddle assembly is disclosed herein and includes an outlet body arrangement, preferably of the cartridge insert type, which is adapted for positioning adjacent to and around an opening in the wall of a pipe. This insert-type outlet arrangement, which includes means to insure that a uniform seal is provided against the pipe wall around the opening, is connected with at least two lugs also comprising part of the saddle assembly. These lugs are located on opposite sides of the boss arrangement, one of the lugs in one embodiment preferably being positioned substantially closer to the outlet arrangement than the other lug. In addition, each of the lugs preferably includes a slotted opening on one side thereof. The saddle assembly also includes a curved strap adapted to extend around a portion of the pipe and including opposite ends preferably adapted to be disposed in the slotted openings for interlocking engagement with the lugs.

12 Claims, 4 Drawing Figures

PIPE SADDLE ASSEMBLY

BACKGROUND OF THE INVENTION

1. Field of the Invention

The present invention relates generally to pipe saddle assemblies and more particularly to a cartridge insert pipe saddle assembly of particular design.

2. Description of Prior Art

Pipe saddle assemblies or service saddles as they are commonly called have been used in the underground utility field for a considerable number of years. These saddles, which take on various configurations, are principally used as a branch connection in tap connecting a secondary transmission line, commonly referred to as a service lateral, to an existing distribution or transmission line. A typical service saddle provided heretofore includes an outlet body or outlet arrangement for seal connecting the service lateral in fluid communication with a tap-in opening provided in the wall of the existing line and one or more straps for holding the outlet arrangement in place.

Most service saddles must meet stringent durability requirements and, as a result, the major component of these saddles, i.e. the outlet arrangement, as furnished over the years, has been constructed of one piece heavy cast copper alloy or cast ductile or malleable iron. The heavy-duty outlet arrangement of this type is generally bolted to the distribution or transmission line by means of the aforestated strap passing around the underside of the line and is equipped with an integral threaded outlet opening. This threaded outlet opening is designed to receive a threaded complementary valve or other such component for connecting the service lateral to the main line. Because the size and thread design of the threaded outlet opening depends on the size of the main line and the size and thread design of the service lateral, it has heretofore been necessary to stock a large number of different saddle assemblies with different threaded openings. In fact, in many cases it has heretofore been necessary to stock approximatey eleven commonly used saddle assemblies of differing sizes for each distribution or transmission line size. In some instances corrosion is a problem and non-ferrous or special corrosion resisting materials such as copper base alloys must be used. For this reason the number of service saddles required in stock can increase two or three-fold for each distribution or transmission size.

Obviously, the aforediscussed requirement to stock a large number of service saddles of different sizes increases record keeping, inventory costs, necessitates the need for added space and ultimately increases the per unit cost of the saddles. Another factor which increases the cost of the service saddles of the above-described type resides particularly in the utilization of the integral threaded outlet. More specifically, it is extremely difficult and time-consuming to drill and tap these threaded openings in the heavy cast material comprising the heretofore provided outlet arrangement. This is especially true where the saddle is used for connecting a relatively large service lateral to a main line, thereby requiring a relatively large threaded outlet opening.

Attempts have been made over the years to use outlet arrangements having threaded inserts, particularly plastic inserts, to avoid the necessity of tapping these large castings and stocking arrangements of various sizes. However, it has been found that these insert-type outlet arrangements have not been completely satisfactory for their intended purpose. One very serious drawback with the insert-type outlet arrangements (and integral cast arrangements) provided heretofore is that they are not designed to provide a reliable fluid seal around the tap-in opening in the main line. As will be seen hereinafter, the present invention is directed to a cartridge insert saddle assembly which, along with other advantages, overcomes this serious drawback.

As stated above, a typical service saddle provided heretofore includes an outlet body or outlet arrangement and one or more straps for securing the outlet arrangement to the distribution or transmission line. In this regard, the service saddle, as also stated above, typically includes a pair of lugs connected with and located on opposite sides of the outlet arrangement for each strap. These lugs include openings through which opposite threaded end segments of the strap can pass. The straps are interlocked to the lugs by means of cooperating nuts thread mounted to the ends of the straps after the ends have been passed through the openings.

It should be apparent that these typically constructed lugs and straps require that the nuts be completely removed from the strap end segments before the latter can be inserted into the openings in the lugs. At first glance, this may appear to be of minor consequence. However, it should be pointed out that the saddles are generaly assembled in the field and usually in a highly confined area within a ditch where the main transmission or distribution line is located. It is often difficult, especially in cold weather, to manipulate the nuts around the threaded ends of the straps making it quite possible to lose the nuts in the somewhat loose dirt under the main line within the ditch. As will be seen hereinafter, the saddle assembly of the present invention is also directed to overcome this problem of assembly.

BRIEF SUMMARY OF THE INVENTION

An object of the present invention is to provide an uncomplicated and economical cartridge insert saddle assembly for tap connecting one pipeline with another pipeline.

Another object of the present invention is to provide a cartridge insert saddle assembly which provides a uniform fluid seal between the two tap-connected pipelines.

Still another object of the present invention is to provide a pipe saddle assembly for tap connecting two pipelines together in a reliable and easily assembled manner.

A pipe saddle assembly utilized, for example, to tap connect a secondary pipeline to a main pipeline is disclosed herein. The assembly comprises an outlet arrangement including a housing and insert adapted for positioning adjacent to and around an opening in the wall of the main pipeline and adapted for connection with the secondary pipeline such that the two lines are in fluid communication with one another. The assembly also includes means for holding the housing and insert in position against the pipe.

In accordance with one feature of the present invention, the outlet arrangement is of the cartridge insert type including an insert housing (as just stated) adapted for positioning adjacent to and around the main pipeline opening, an insert (also as just stated), preferably plastic, positionable within the housing in a predetermined way and circumferential sealing means, for example a gasket, to be positioned directly under the insert and uniformly pressed against the pipeline wall around the opening therein. As the outlet arrangement, once assembled together in this manner, is initially secured to the pipeline wall around the opening therein, the insert housing and insert have a tendency to rotate slightly from their initial position otherwise creating unequal gasket pressure and reducing the quality of the gasket seal. This is generally true for most pipe saddle assemblies of the insert type. In accordance with the present invention, the housing and insert include unique cooperative means for allowing this displacement of the housing without displacement of the insert and without changing the direction of force applied against the sealing means by the housing and insert. Hence, even with this rotation of the housing, the sealing means remains uniformly pressed against the pipe wall and a uniform seal is provided between the pipe wall and insert around the opening in the pipe wall, regardless of how the body is tightened on the pipe.

In accordance with another feature of the present invention, the pipe saddle assembly disclosed herein, which may or may not be of the cartridge insert type, includes uncomplicated means for easily assembling the saddle assembly around the pipe. Briefly, the assembly includes at least one pair of lugs connected with and positioned on opposite sides of the outlet arrangement. Each of these lugs includes a top surface, a bottom surface and a slot extending from the top surface to the bottom surface and opening to one side of the lug. The assembly also includes at least one curved strap which is adapted to extend around the underside of the pipe and which includes opposite end portions adapted for positioning in the lug slots from the side openings thereof. Suitable means are provided for respectively securing these opposite end portions in the lug slots. Because of the lug design, these means, for example, nuts, do not have to be removed from the strap end portions prior to interlocking the end portions with the lugs.

Still another feature of the present invention resides in providing the pipe saddle assembly, which again may or may not be of the cartridge insert type, with at least one pair of lugs connected with and positioned on opposite sides of the outlet arrangement. In this particular embodiment of the present invention, the outlet arrangement is positioned substantially closer to one of the lugs than the other. The outlet arrangement is held in position against the pipe wall by interlocking opposite ends of the securing strap to these lugs. However, the tightening adjustment required for accomplishing this preferably takes place only at one of the lugs, i.e. the lug closest to the outlet arrangement. In this way, if, for example, a nut-bolt arrangement is used to interlock the closer lug with its associated strap end segment, substantially less turns of the nut are required for tightening the assembly than would be the case if the arrangement were equidistant from the two lugs.

DETAILED DESCRIPTION AND PREFERRED EMBODIMENTS

Figure 1:
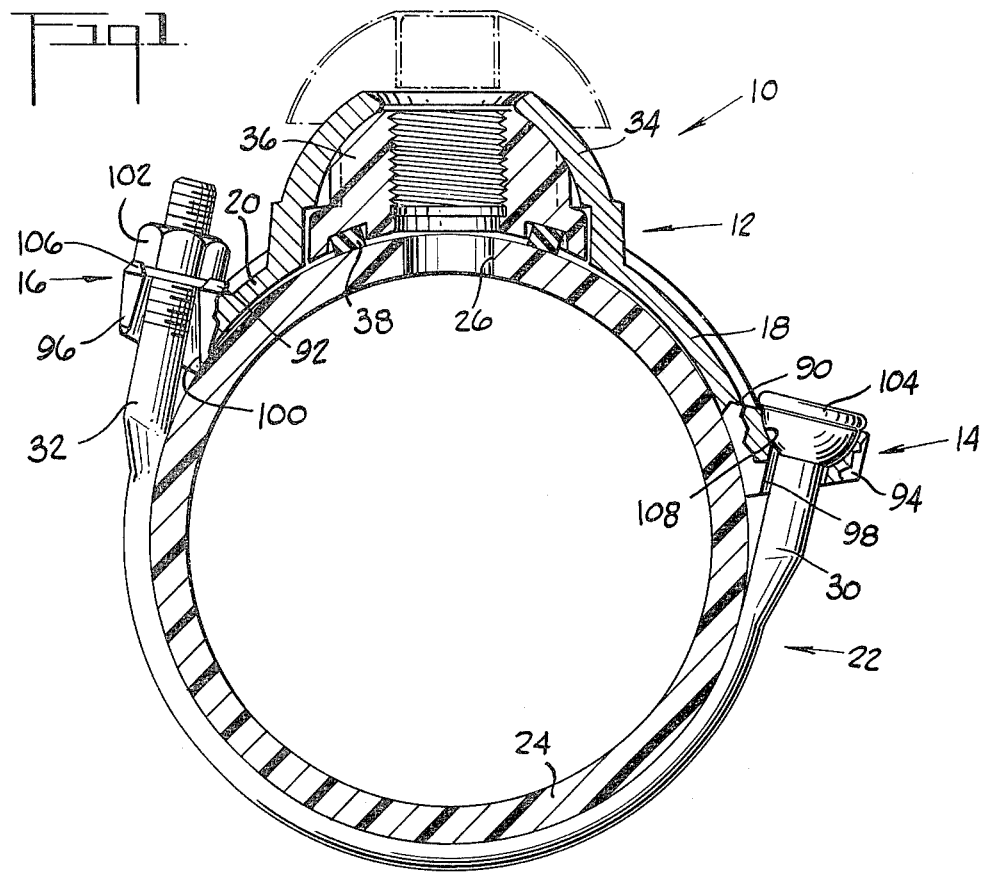
FIG. 1 is a vertical sectional view partially in cross-section, illustrating a pipe saddle assembly constructed in accordance with the present invention in an assembled position around a pipe.
Figure 2:
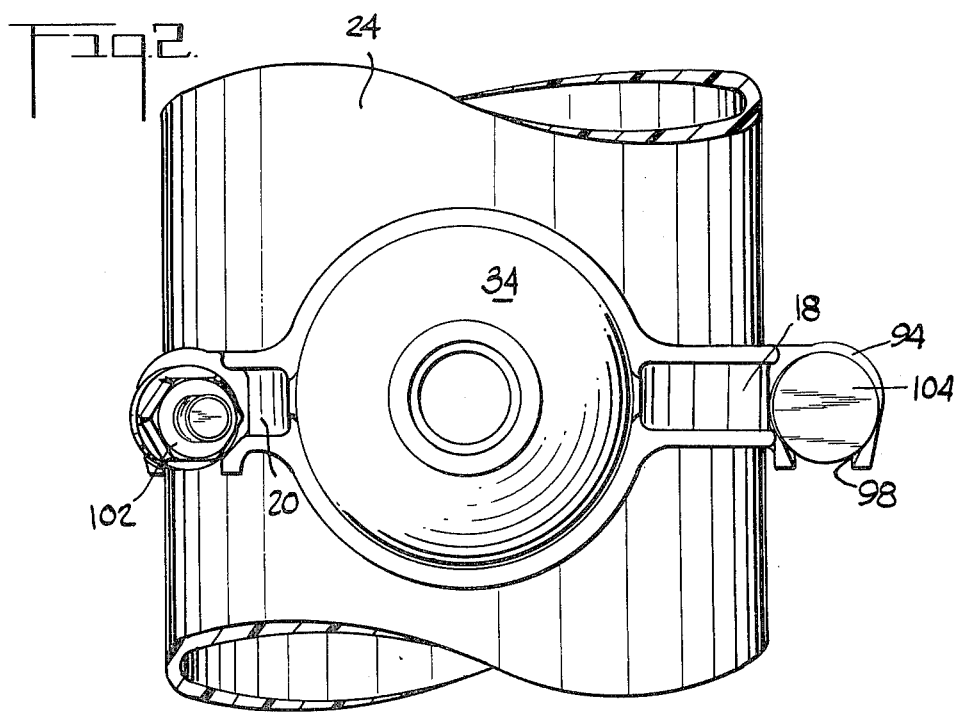
FIG. 2 is a top plane view of the assembly of FIG. 1.

Turning now to the drawings, wherein like components are designated by like reference numerals throughout the various figures, a pipe assembly 10, constructed in accordance with one embodiment of the present invention, is illustrated in FIGS. 1 and 2. As stated previously, assembly 10 is provided for tap connecting a secondary pipeline, for example, a service lateral, to a main pipeline, for example an existing distribution or transmission line, for fluid communication therebetween. To accomplish this, assembly 10, which is of the cartridge insert type, includes an outlet arrangement 12, a pair of lugs 14 and 16 connected with the outlet arrangement by respective curved connecting bars 18 and 20 and an assembly-securing strap 22. Actually, assembly 10 may include a plurality of lugs on each side of outlet arrangement 12. This, of course, would require an equal plurality of assembly-securing straps. The number of lugs and straps required will, for the most part, depend upon the overall size of the assembly.

As will be discussed in more detail hereinafter, outlet arrangement 12 is held tightly against the outer wall of the pipe to be tapped, for example, pipe 24, and specifically in fluid sealing engagement with the outer surface of the pipe immediately surrounding a tap-in opening 26 (see FIG. 1) provided in pipe 24. This is accomplished, as will also be discussed in more detail hereinafter, by initially positioning the outlet arrangement against the wall of pipe 12 and directly over tap-in openin 26, as best seen in FIG. 1. The assembly-securing strap 22 is positioned around the underside of the pipe and its opposite ends 30 and 32 are respectively interlocked with lugs 14 and 16 by slipping the strap with nuts (to be discussed) along the pipe and into slot (also to be discussed) in the lugs. Thereafter, the strap is adjusted tightly around the pipe so as to cause the outlet arrangement to press the insert tightly against the surface area of the pipe immediately surrounding opening 26. After saddle assembly 10 is securely assembled around pipe 24, a secondary pipe (not shown) may be readily connected in fluid sealing engagement with the outlet arrangement such that the secondary pipe is in fluid communication with pipe 24 through the outlet arrangement and tap-in opening 26.

Turning to a detailed description of the components comprising assembly 10, attention is firstly directed to outlet arrangement 12. As illustrated best in FIG. 1, this arrangement includes an insert housing 34, an insert 36 positioned within the housing in a predetermined way and a circumferential sealing gasket 38 of known kind. As illustrated, the sealing gasket is positioned directly against the wall of pipe 24 around tap-in opening 26 and the insert is positioned directly over the gasket within housing 34, the latter being connected with lugs 14 and 16 by connecting bars 18 and 20. With assembly 10 in position and with strap 22 tightened securely around pipe 24, housing 34 exerts an inwardly directed force against insert 36 which, in turn, exerts an inwardly directed force against gasket 38, thereby resulting in the gasket engaging tightly against pipe 24 so as to form a fluid seal therebetween.

To provide a reliable fluid seal, it is important to insure that the insert bears evenly against the gasket such that it exerts equal force along all points around the gasket. This is not as easy as it might appear at first glance since, during initial tightening of strap 22, insert housing 34 has a tendency to be displaced a small amount in the direction of one of the lugs. Hence, even if housing 34 is initially positioned relative to insert 36 and gasket 38 to provide uniformly applied pressure against the gasket, displacement of the housing may and more than likely will produce a shift in the forces applied to the gasket by the insert, unless of course the insert and housing are designed to prevent this from occurring. As will be seen below, housing 34 and insert 36 are, in fact, specifically designed such that insert 36 bears uniformly against gasket 38 and continues to bear uniformly against the gasket even though the insert housing may be considerably displaced as a result of the tightening of strap 22.

Figure 3:
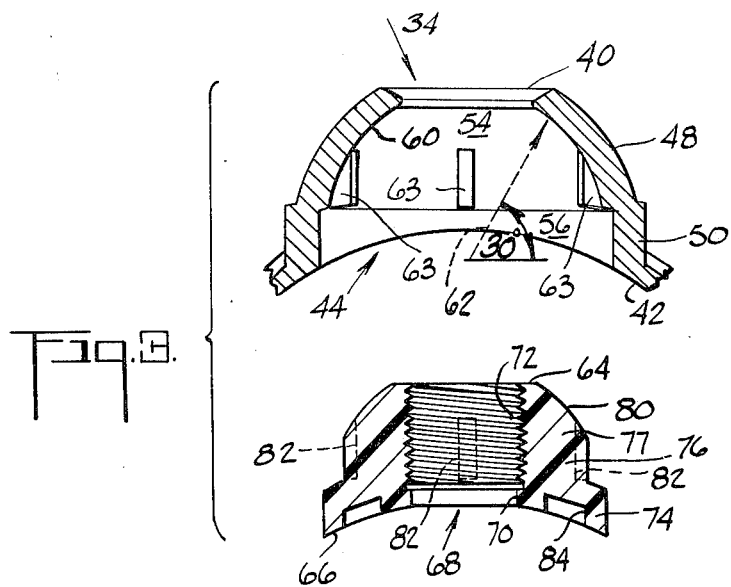
FIG. 3 is a cross-sectional view of two components of the assembly of FIG. 1.

Turning to FIG. 3, attention is specifically directed to housing 34, which may be constructed of any suitably hard material but which is preferably constructed of ductile or malleable iron. As illustrated in this figure, the housing includes a top or outer open end 40 and a bottom or inner open end 42 and an internal insert-receiving chamber 44 located therebetween. As can be seen in FIG. 3, bottom end 42 is curved slightly to conform better to the outer surface of pipe 24. For purposes of description, the housing may be divided into two segments, a top segment 48 and a larger cylindrical bottom segment 50. Also for purposes of description, chamber 44 may be divided into two segments, a top chamber segment 54 which is defined by housing segment 48 and a bottom chamber segment 56 which is defined by housing segment 50.

Top segment 48 of housing 34 includes an internal shouldered surface 60 which extends completely around at least a portion of chamber segment 54, as illustrated in FIG. 3. In accordance with one feature of the present invention, this shouldered surface faces inwardly toward the bottom end of the housing and defines a segment of a spherical surface, which spherical surface has a center located on the axis of chamber 44 below surface 60, as indicated by imaginary radius 62. In addition, surface 60 is preferably approximately positioned such that radius 62 is approximately 30° from a plane perpendicular to the axis of chamber 44. The reason for and location of this surface will be discussed in detail hereinafter. At this time, it will suffice to say that surface 60, which may hereinafter be referred to as a "ball surface," cooperates with a complementary surface on insert 36 such that the insert bears uniformly against gasket 38 regardless of the aforedescribed displacement of housing 34.

In accordance with another feature of the present invention, housing 34 includes a plurality of internal interlocking lugs or webs 63 which are circumferentially spaced around the lower end of chamber segment 54 and which project into the chamber segment from the internal surface of housing segment 48. As will be seen hereinafter, these webs cooperate with insert 36 to prevent the latter from rotating within the housing.

Having described housing 34, attention is now directed to a detailed description of insert 36. As also illustrated best in FIG. 3, the insert, which is preferably constructed of plastic and molded into an integral unit, includes a top or upper end 64, a bottom or inner end 66 which is curved in manner similar to end 42 of housing 34 and a centrally located passageway 68 extending through the insert from its bottom end to its top end. This passageway includes a lower cylindrical section 70 which is aligned directly over the tap-in opening 26 of pipe 24 when the saddle assembly is assembled to pipe 24. In this regard, passageway section 70 is preferably greater in diameter than the tap-in opening 26, as best illustrated in FIG. 1. Passageway 68 also includes an upper cylindrical section 72 which is preferably coaxial with and may or may not be smaller in diameter than section 70. Section 72, as shown in FIG. 3, is threaded to receive cooperating threaded means (not shown) adapted to fluid connect the insert with the secondary pipe to be tapped into pipe 24.

Insert 36 may be separated into three main segments, a bottom cylindrical segment 74, a reduced but coaxial intermediate cylindrical segment 76 and a top segment 77 joining segments 74 and 76. Top segment 77 includes an external shouldered surface 80 which is designed substantially as the complement of previously discussed ball surface 60 and which may hereinafter also be referred to as a ball surface. More specifically, surface 80 which faces upwardly and outwardly and which extends concentrically around the axis of passageway 68, defines a segment of the same spherical surface defined by ball surface 60. The way in which these two ball surfaces cooperate will be discussed hereinafter.

Insert 36 also includes recesses 82 located in intermediate segment 76. These recesses, which are circumferentially spaced around segment 77 and which are equal in number to the previously discussed webs 63 of housing 34, are provided for receiving the webs and thereby serve to prevent the insert from rotating about the axis of passageway 68 when the insert is appropriately positioned within the housing and the service connection is threaded into the insert.

In addition to the foregoing, insert 36 also includes an annular groove 84 located in bottom end 66 and concentrically around passageway section 70. This groove, as best seen in FIG. 3, is designed to receive the top portion of gasket 38 when the saddle assembly is secured in position against pipe 24 to prevent the gasket from slipping out from under the insert.

Having described housing 34 and insert 36, attention is now directed to how these two components cooperate in maintaining uniform pressure against gasket 38 even though the housing may be displaced as a result of tightening strap 22. As illustrated in FIG. 1, the insert is coaxially positioned within housing 34 such that the top ends of the two and the bottom ends of the two are respectively adjacent one another and such that webs 63 are located within recesses 82. The insert and insert housing are preferably dimensionally designed so that, with the insert positioned within the housing in this coaxial fashion, the only engagement between the two is at ball surfaces 60 and 80. Therefore, pressure exerted against the insert by the housing is in an inwardly and downwardly direction along the radii of the surfaces. In addition, sufficient space is provided between the insert and housing to allow ball surface 60 to slide a small distance up or a small distance down ball surface 80 before further engagement is made between the insert and housing.

Hence, should tightening of strap 22 cause the housing to pivot off center with respect to the axis of insert 36, it will slide along ball surface 80. However, because the only engagement between these two components is along the ball surfaces, the direction of force applied to the insert by the housing will remain inwardly and downwardly along radii including radius 62, i.e., unchanged, and therefore the direction of force applied to the gasket by the insert will remain unchanged. This is, of course, assuming that the housing does not pivot off center an amount which is much greater than the allowed space between the unengaged surfaces of the two components. In this regard, the ball surfaces should be sufficiently large and the spaces between the unengaged surfaces should be sufficiently wide to allow for expected off-center pivoting of the housing. The arc span of each of the ball surfaces is, for example, approximately ⅜ inch (from inner point to outer point) and the space provided between the unengaged surfaces of the housing and insert should be sufficient to compensate for the maximum expected displacement of the housing.

As stated previously, ball surface 60 (and surface 80) are defined by a radius, i.e., radius 62, which is preferably at an angle approximately 30° with a plane perpendicular to the axis of chamber 44. This angle is selected to minimize, preferably prevent, outward spreading of the plastic insert and deformation of threaded passageway segment 72 as a complementary valve is threaded into the insert. It has been found that the ball surfaces, especially having the 30° radius, engage one another to a degree sufficient to substantially minimize insert spreading while still readily allowing the two ball surfaces to slide against one another.

As seen best in FIG. 1, a cap indicated by phantom lines may be provided to hold the insert within the housing during, for example, shipping. This insert could include a cylindrical portion adapted to tightly fit within opening 68, thus preventing the insert from falling out the bottom of the housing.

Having described outlet arrangement 12, in both structure and operation, attention is now directed to lugs 14 and 16 and strap 22 which are provided for securing the outlet arrangement against pipe 24 in the manner described. As stated previously, lugs 14 and 16 are connected to and on opposite sides of boss arrangement 12 by means of connecting bars 18 and 20 which, along with the lugs, are constructed of a relatively hard material, preferably ductile or malleable iron and, in fact, preferably integrally cast along with the housing of the arrangement. The connecting bars preferably bend downwardly and outwardly from the outlet arrangement, as illustrated in FIG. 1, so that they conform to a large degree to the outer surface of pipe 24. Hence, they position lugs 14 and 16, which are located at the end of the bars, directly against the pipe at points on opposite sides of and below the outlet arrangement.

In accordance with another feature of the present invention, each of respective lugs 14 and 16 includes a top surface 90, 92, a bottom surface 94, 96 and a slot 98, 100 extending from the top surface to the bottom surface and opening to one side of the lug. As will be discussed hereinafter, these slots 98 and 100 are adapted to receive opposite end segments 30 and 32 of strap 22. This strap, which is constructed of steel or other such malleable material having a slight amount of resiliency or give, is curvilinear in shape to fit around the underside of pipe 24. The strap preferably conforms throughout most of its length to the outer surface of approximately half of the pipe so as to fit closely against the pipe. One end segment of the strap, for example end segment 32, is threaded to receive a cooperating nut 102. The other end segment 30 preferably includes an enlarged head 104.

In assembling pipe saddle assembly 10 around pipe 24, outlet arrangement 12 is positioned along with lugs 14 and 16 and connecting bars 18 and 20 against pipe 24 in the manner shown in FIG. 2. Strap 22 is positioned around the underside of the pipe and slid along the pipe until the end segments 30 and 32 of the strap are positioned in slots 98 and 100. Obviously, to accomplish this, the enlarged head 104 and the nut 102 must be initially located above the top surfaces of the lug. However, it should be noted that the nut need not be first removed entirely from the end segment 32. Once end segments 30 and 32 are in place within slots 98 and 100, nut 102 is screwed down along its associated strap end segment, eventually bearing against top surface 92 of lug 16. Continued rotation of the nut in the same direction causes the enlarged head 104 to bear down against the top surface 90 of lug 14 and, hence, causes the overall assembly to tighten around pipe 24. In this regard, lug 16 may include one or more projections 106 located on top surface 92 so as to prevent the nut and, in fact, the entire end segment 32 of strap 22 from slipping out of slot 100 during tightening of the strap. In addition, top surface 90 of lug 14 may include a recessed seat 108 which accommodates enlarged head 104 as the latter bears down against lug 14.

From the foregoing, it should be apparent that assembly 10 is tightened around pipe 24 only at one lug, i.e. lug 16. Hence, if assembly 10 is being used to tap into an existing pipeline, tap-in opening 26 can be suitably positioned and assembly 10 can be suitably positioned such that lug 16 is readily accessible without being concerned about the position of lug 14. This feature, along with the fact that the nut 102 does not have to be initially removed or manipulated apart from strap 22, allows the overall assembly to be easily assembled around and tightened against pipe 24. Obviously, end segment 30 of strap 22 could be identical to end segment 32, that is, it could include a threaded end adapted to receive a nut in the same manner as end segment 32. In this case, lug 14 would preferably be identical to lug 16.

In accordance with still another feature of the present invention, lug 16, i.e. the lug at which the strap 22 is tightened, is preferably substantially closer to outlet arrangement 12 than lug 14. Hence, connecting bar 20 is shorter in length than connecting bar 18. By positioning lug 16 closer to outlet arrangement 12 than lug 14, the outlet arrangement moves inwardly a greater distance for each turn of the nut 102 than would be the case if the outlet arrangement were centered equidistant from the two lugs. Hence, a less number of turns of nut 102 are required which increases ease of assembly. Obviously, both lugs could be equidistant from outlet arrangement 12.

Figure 4:
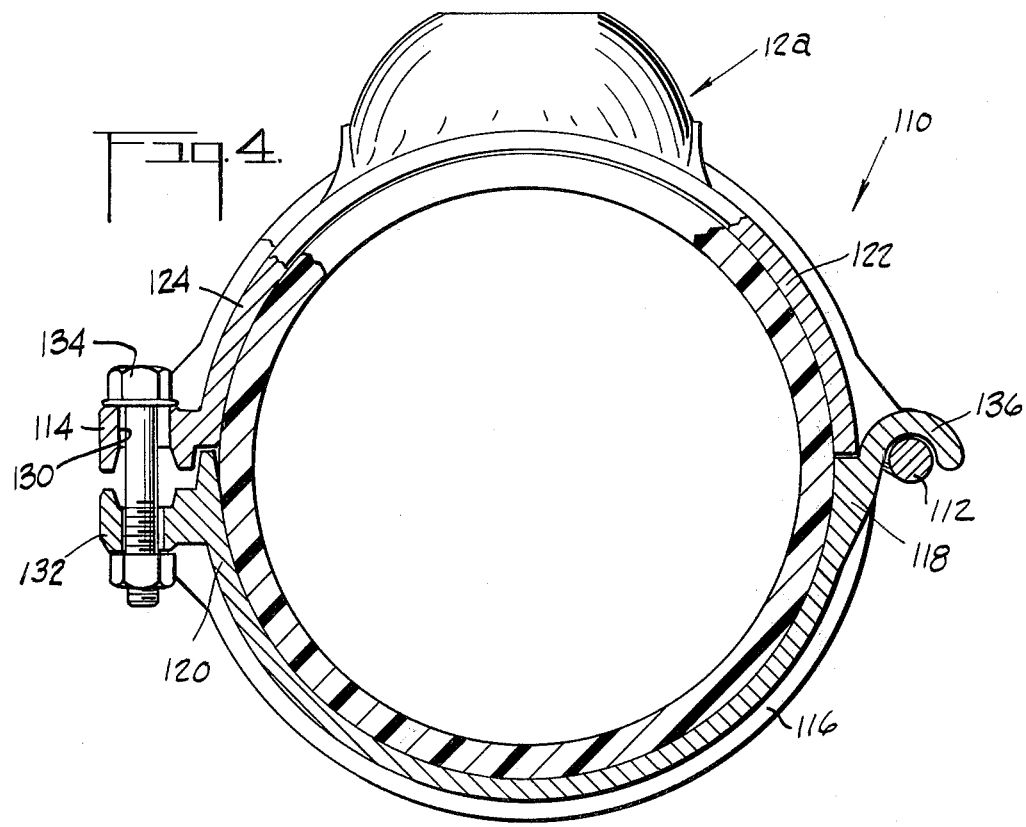
FIG. 4 is a side-elevational view, in cross-section, of a pipe saddle assembly constructed in accordance with another embodiment of the present invention.

Turning to FIG. 4, attention is directed to a pipe saddle assembly 110 constructed in accordance with another embodiment of the present invention. This assembly includes an outlet arrangement 12a, preferably identical to previously described arrangement 12. This assembly also includes lugs 112 and 114, different than the previously described lugs, and a securing strap 116 which, throughout most of its length, is preferably identical to the previously described strap but which has modified end segments 118 and 120.

Previously discussed embodiment 10 is not shaped to fit entirely contiguously around pipe 24 but is rather somewhat oval in shape. Hence, assembly 10 is preferably used with pipes constructed of fairly rigid material which will not deform as the assembly is squeezed tightly around the pipe, thus accommodating a range of varying pipe outer diameters. Assembly 110, on the other hand, is preferably used with a pipe which might deform under these conditions such as, for example, PVC pipe. As a result, assembly 110 includes connecting bars 122 and 124 (connecting lugs 112 and 114 to outlet arrangement 12a) which conform quite closely to the outer surface of a portion of the pipe against which it is positioned. In the same manner, strap 116 conforms quite closely to the remaining portion of the pipe, i.e., to that portion against which it is positioned. Moreover, outlet arrangement 12a may be positioned equidistant from lugs 112 and 114 as illustrated or it may be positioned closer to lug 114, for the same reasons discussed hereinabove.

Lug 114 includes a top surface 126, a bottom surface 128 and a central opening 130 extending through the lug from its top surface to its bottom surface. End segment 120 of strap 116 preferably includes a substantially identical lug 132 which, when the assembly is in position around the pipe, is aligned with lug 114 so that both receive a bolt 134 through their aligned openings. A nut (not shown) or other such means would, of course, be provided to lock Tee bolt 134 in place. Lug 112 preferably takes the form of a cylindrical finger which extends parallel to the axis of the pipe and which fits under a cooperating hook 136 comprising part of end segment 118 of strap 116.

What I claim is:

1. A pipe saddle assembly, comprising:
   a. an insert housing having an outer open end and an inner open end, the inner open end being adapted for positioning adjacent to and around an opening in the wall of a pipe;
   b. an insert having an outer end, an opposite inner end and an opening extending through the insert from its inner end to its outer end, said insert being positioned in a predetermined way within said housing such that the inner ends and the outer ends of said insert and housing are respectively adjacent each other;
   c. said housing including an inwardly facing internal shouldered surface and said insert including a complementary, outwardly facing, external shouldered surface which slidably abuts against said internal shouldered surface when said insert is positioned within said housing in said predetermined way, said shouldered surfaces respectively defining segments of a spherical surface;
   d. circumferential sealing means positioned adjacent the inner end of said insert around the opening therein and being adapted to engage against said pipe wall around the opening in said pipe wall; and
   e. means for holding said housing, insert and sealing means in position against said pipe.

2. An assembly according to claim 1 wherein said shouldered surfaces are annular and extend concentrically around the opening in said insert when said insert is positioned within said housing in said predetermined way.

3. An assembly according to claim 2 wherein said housing and said insert engage one another only at said shouldered surfaces when said insert is positioned within said housing in said predetermined way.

4. An assembly according to claim 1 wherein said housing and said insert include cooperating means for preventing rotational movement of said insert within said housing when said insert is positioned within said housing in said predetermined way.

5. An assembly according to claim 1 wherein:
   a. said insert opening includes a cylindrical portion which is threaded to receive an externally threaded tap-in element, and
   b. said shouldered surfaces engage against one another to prevent the threaded portion of said insert opening from expanding radially when said insert is positioned within said housing in said predetermined way.

6. An assembly according to claim 5 wherein:
   a. said shouldered surfaces are annular and extend concentrically around the threaded cylindrical portion of said insert opening when said insert is positioned within said housing in said predetermined way, and
   b. said housing and insert, when said insert is positioned within said housing in said predetermined way, engage one another only at said shouldered surfaces and include cooperating means for preventing rotational movement of said insert about the axis of said threaded portion of said insert opening.

7. An assembly according to claim 6 wherein said shouldered surfaces define a center located on the axis of said threaded opening portion near the inner end of said insert when said insert is positioned within said housing in said predetermined way.

8. An assembly according to claim 7 wherein said insert includes a circumferential groove within which said sealing means is located, said groove being located at the inner end of said insert and around said insert opening.

9. An assembly according to claim 1 wherein said holding means includes:
   a. a pair of lugs connected with said housing and positioned on opposite sides of and below said housing, each of said lugs having:
      i. a top surface,
      ii. a bottom surface, and
      iii. a slot extending from said top surface to said bottom surface and opening to one side of said lug.
   b. a curved shape strap adapted to extend around a portion of said pipe, said strap including opposite end portions which fit in said lug slots, and
   c. means for securing said end portions in said slots.

10. An assembly according to claim 1 wherein said holding means includes a pair of lugs connected with said housing and positioned on opposite sides of said housing, one of said lugs being positioned substantially closer to said housing than said other lug.

11. An assembly according to claim 1 wherein said sealing means comprises a circumferential sealing gasket having a rectangular cross-section.

12. A pipe saddle assembly comprising:
   a. an insert housing having an outer open end and an inner open end, the inner open end being adapted for positioning adjacent to and around an opening in the wall of a pipe;
   b. an insert having an outer end, an opposite inner end and an opening extending through the insert from its inner end to its outer end, said insert being positioned in a predetermined way with said housing such that the inner ends and the outer ends of said insert and housing are respectively adjacent each other;

c. a pair of lugs connected with and positioned on opposite sides of said housing;

d. circumferential sealing means positioned adjacent the inner end of said insert around the opening therein and around the opening in said pipe wall;

e. means interlocking with said lugs for securing said housing, insert and sealing means in position against said pipe such that said housing and insert bear against said sealing means and such that said sealing means uniformly presses against said pipe wall around said pipe wall opening; and f. said housing and insert including cooperative means for allowing a small amount of pivotal movement of said housing in the directions of said lugs and relative to said pipe while preventing said movement of said housing from causing said sealing means to bear against said pipe wall in a non-uniform way, said cooperative means comprising engaging complementary shouldered surfaces which define segments of a spherical surface.

* * * * *